(12) United States Patent
Doering

(10) Patent No.: US 9,261,171 B2
(45) Date of Patent: Feb. 16, 2016

(54) BELT DRIVE FOR A MOTOR-DRIVEN TOOL

(71) Applicant: MAKITA CORPORATION, Aichi (JP)

(72) Inventor: Manfred Doering, Neuhof (DE)

(73) Assignee: MAKITA CORPORATION, Aichi (JP)

( * ) Notice: Subject to any disclaimer, the term of this patent is extended or adjusted under 35 U.S.C. 154(b) by 107 days.

(21) Appl. No.: 14/011,973

(22) Filed: Aug. 28, 2013

(65) Prior Publication Data

US 2014/0073467 A1 Mar. 13, 2014

(30) Foreign Application Priority Data

Sep. 13, 2012 (DE) .................... 20 2012 103 489 U

(51) Int. Cl.
| | | |
|---|---|---|
| *F16H 7/10* | (2006.01) | |
| *F16H 7/14* | (2006.01) | |
| *F16H 7/16* | (2006.01) | |

(52) U.S. Cl.
CPC .. *F16H 7/14* (2013.01); *F16H 7/16* (2013.01); *Y10T 29/49455* (2015.01)

(58) Field of Classification Search
CPC ............ F16H 7/1281; F16H 2007/081; F16H 2007/0844; F16H 2007/088; F16H 7/16
USPC ........................................................ 474/112
See application file for complete search history.

(56) References Cited

U.S. PATENT DOCUMENTS

| | | | | |
|---|---|---|---|---|
| 525,694 A | * | 9/1894 | Van Dyke Cruser | 74/413 |
| 565,819 A | * | 8/1896 | Weed ............................. | 474/47 |
| 586,624 A | * | 7/1897 | Roberts ........................ | 474/112 |
| 587,710 A | * | 8/1897 | Decker ......................... | 474/112 |
| 604,294 A | * | 5/1898 | Bernson ....................... | 474/112 |
| 605,743 A | * | 6/1898 | Pinover ........................ | 474/112 |
| 620,241 A | * | 2/1899 | Levedahl ..................... | 474/112 |
| 628,820 A | * | 7/1899 | Lamplugh .................... | 301/110 |
| 648,937 A | * | 5/1900 | Fauber ......................... | 474/112 |
| 654,182 A | * | 7/1900 | Rupsch ........................ | 280/288 |
| 716,129 A | * | 12/1902 | Steinkamp ..................... | 474/78 |
| 724,417 A | * | 4/1903 | Anderson ..................... | 474/112 |
| 1,137,134 A | * | 4/1915 | Harley ......................... | 474/112 |
| 1,250,636 A | * | 12/1917 | Ostrovsky ..................... | 601/40 |
| 1,467,591 A | * | 9/1923 | Riker ........................... | 474/112 |
| 1,913,872 A | * | 6/1933 | Dow ............................ | 474/112 |

(Continued)

FOREIGN PATENT DOCUMENTS

| | | |
|---|---|---|
| DE | 663277 | 8/1938 |
| DE | 102005051652 | 5/2007 |

(Continued)

OTHER PUBLICATIONS

United Kingdom Search Report, mail date is Apr. 17, 2014.

(Continued)

*Primary Examiner* — Henry Liu
(74) *Attorney, Agent, or Firm* — Greenblum & Bernstein, P.L.C.

(57) ABSTRACT

In order to provide a belt drive for a motor-driven tool with a first, drive-side belt pulley, a second, tool-side belt pulley and a belt that can be tensioned over the first and the second belt pulley, that is characterized by being easier to use, it is proposed that a cam, rigidly connected with a shaft, is arranged in the first or second belt pulley, whereby during a rotational movement of the shaft the belt pulley can be moved from an eccentric arrangement in relation to the shaft into a concentric arrangement by way of a translational movement and a rotational movement of the belt pulley.

11 Claims, 12 Drawing Sheets

(56) References Cited

U.S. PATENT DOCUMENTS

Figure 1A:
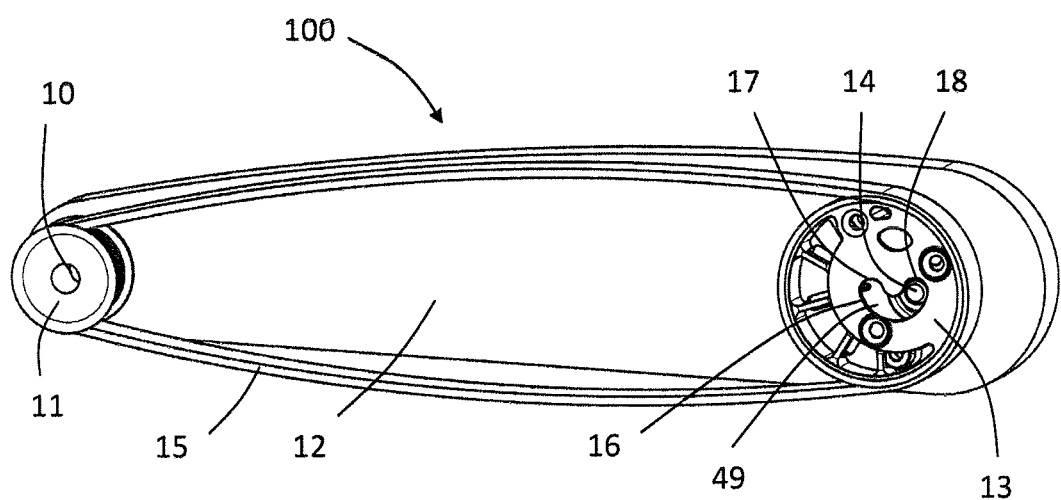
Figure 1B:
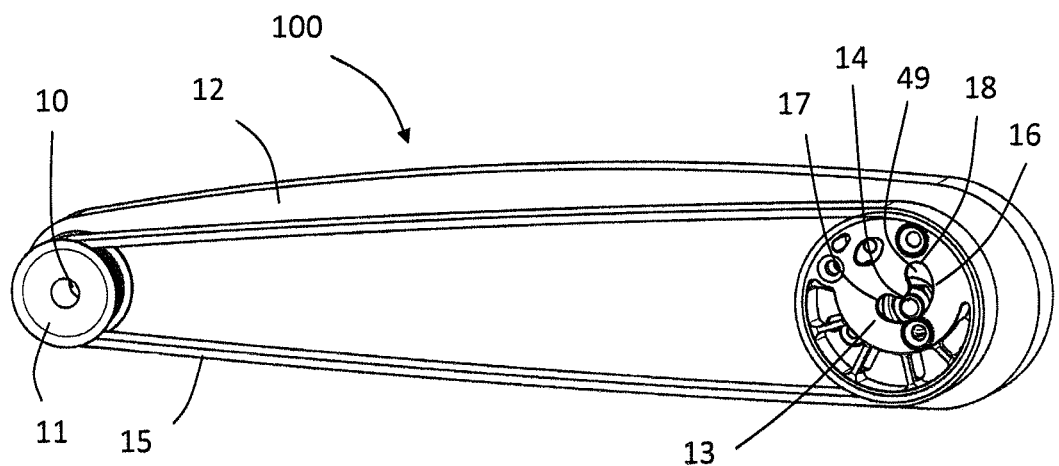

| | | | | |
|---|---|---|---|---|
| 2,002,081 | A * | 5/1935 | Dow | 474/110 |
| 2,139,913 | A * | 12/1938 | Ramsey | 474/112 |
| 2,196,255 | A * | 4/1940 | Dow | 474/112 |
| 2,337,591 | A * | 12/1943 | Coulson | 474/112 |
| 2,388,305 | A * | 11/1945 | Beckwith | 414/722 |
| 2,393,993 | A * | 2/1946 | Knox | 267/281 |
| 2,409,526 | A * | 10/1946 | Ausherman | 474/112 |
| 2,575,313 | A * | 11/1951 | Covert et al. | 474/110 |
| 2,691,553 | A * | 10/1954 | Pettigrew | 384/447 |
| 2,823,937 | A * | 2/1958 | La Barre | 474/113 |
| 2,909,074 | A * | 10/1959 | Scheiterlein | 474/86 |
| 3,829,176 | A * | 8/1974 | Miokovic | 384/215 |
| 4,235,121 | A * | 11/1980 | Cook | 474/89 |
| 4,237,744 | A * | 12/1980 | Jolly | 474/116 |
| 4,501,576 | A * | 2/1985 | Tanaka et al. | 474/141 |
| 4,516,962 | A * | 5/1985 | Brandenstein et al. | 474/112 |
| 4,610,645 | A * | 9/1986 | Donn et al. | 474/112 |
| 4,643,700 | A * | 2/1987 | Brandenstein et al. | 474/112 |
| 4,769,671 | A * | 9/1988 | Koff | 399/164 |
| 4,808,147 | A * | 2/1989 | Graham | 474/112 |
| 4,809,438 | A * | 3/1989 | Nagashima et al. | 30/390 |
| 4,816,012 | A * | 3/1989 | Bytzek | 474/135 |
| 4,824,421 | A * | 4/1989 | Komorowski | 474/135 |
| 4,832,665 | A * | 5/1989 | Kadota et al. | 474/112 |
| 4,889,436 | A * | 12/1989 | Lynn, Jr. | 384/447 |
| 4,934,987 | A * | 6/1990 | Kadota et al. | 474/112 |
| 5,015,216 | A * | 5/1991 | Brandenstein et al. | 474/101 |
| 5,078,656 | A * | 1/1992 | Brandenstein et al. | 474/112 |
| RE34,543 | E * | 2/1994 | Komorowski | 474/135 |
| 5,713,808 | A * | 2/1998 | Ohta | 474/94 |
| 5,752,892 | A * | 5/1998 | Taomo et al. | 474/112 |
| 5,759,125 | A * | 6/1998 | Berg | 474/112 |
| 5,820,503 | A * | 10/1998 | Bruchner et al. | 474/112 |
| 6,129,645 | A * | 10/2000 | Burrows | 474/112 |
| 6,186,918 | B1 * | 2/2001 | Yoo | 474/112 |
| 6,196,940 | B1 * | 3/2001 | Lehtovaara | 474/112 |
| 6,699,149 | B1 * | 3/2004 | White et al. | 474/133 |
| 7,059,947 | B2 * | 6/2006 | Crover | 451/311 |
| 7,101,295 | B2 * | 9/2006 | Taomo et al. | 474/117 |
| 7,131,897 | B2 * | 11/2006 | Crover | 451/311 |
| 7,611,431 | B2 * | 11/2009 | Dinca et al. | 474/112 |
| 7,837,000 | B2 * | 11/2010 | Matsuura et al. | 180/351 |
| 8,070,633 | B2 * | 12/2011 | Bushnell | 474/112 |
| 8,272,983 | B2 * | 9/2012 | Rolando et al. | 474/112 |
| 8,312,959 | B1 * | 11/2012 | Schneider et al. | 180/444 |
| 8,561,498 | B2 * | 10/2013 | Domahidy | 74/570.1 |
| 8,668,027 | B2 * | 3/2014 | Hoffmann et al. | 173/215 |
| 8,939,857 | B2 * | 1/2015 | Doering et al. | 474/112 |
| 2008/0026894 | A1 * | 1/2008 | Dinca et al. | 474/112 |
| 2009/0283286 | A1 * | 11/2009 | Hoffmann et al. | 173/215 |
| 2012/0190488 | A1 * | 7/2012 | Doering et al. | 474/112 |
| 2013/0165284 | A1 * | 6/2013 | Mennerat et al. | 474/112 |

FOREIGN PATENT DOCUMENTS

| | | |
|---|---|---|
| DE | 10 2008 023 927 | 11/2009 |
| DE | 202011000143 | 8/2012 |
| EP | 1062438 | 5/2002 |
| JP | 01-15571 | 1/1989 |
| WO | 2007/014624 | 2/2007 |
| WO | 2007/048657 | 5/2007 |

OTHER PUBLICATIONS

Germany Office action, dated May 2, 2013 along with an english translation thereof.

* cited by examiner

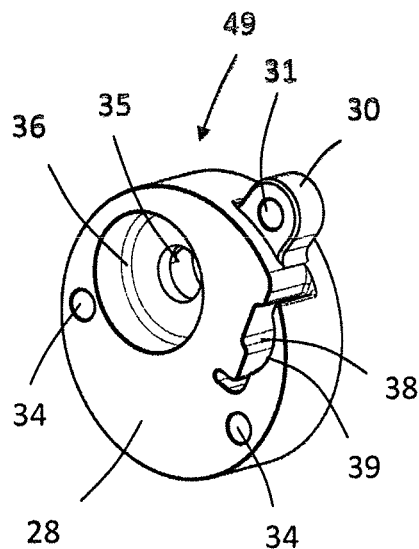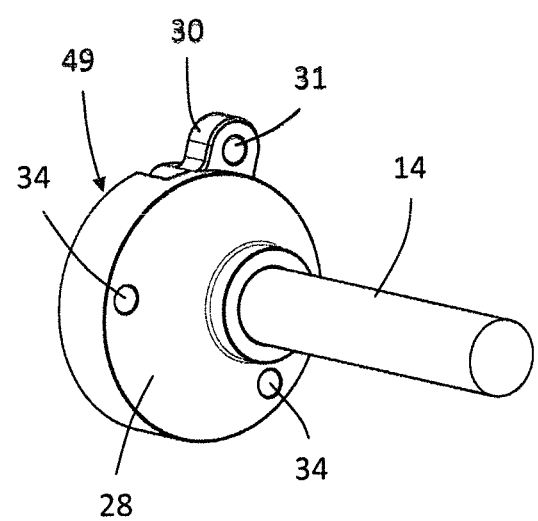
Fig. 5                Fig. 6
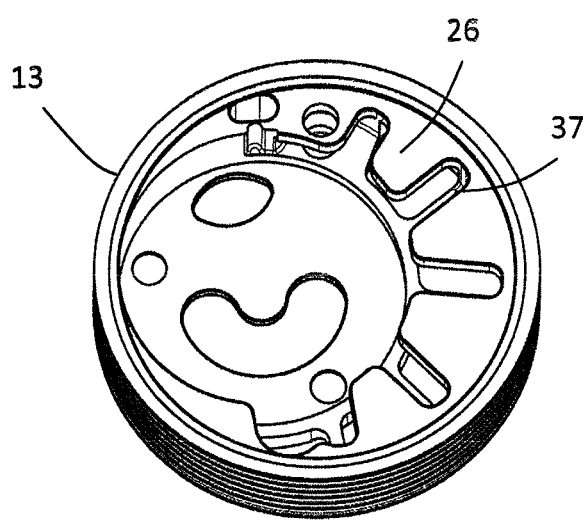
Fig. 7

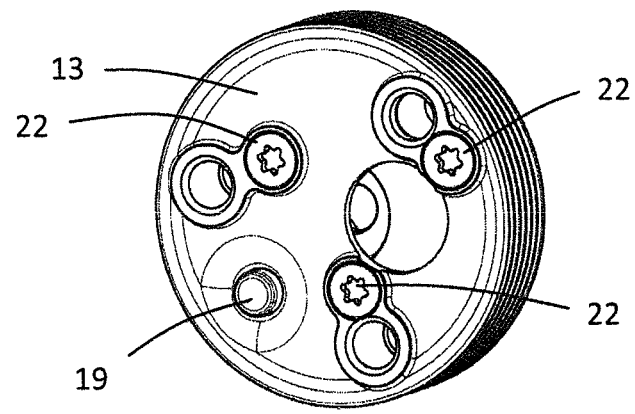
Fig. 10a
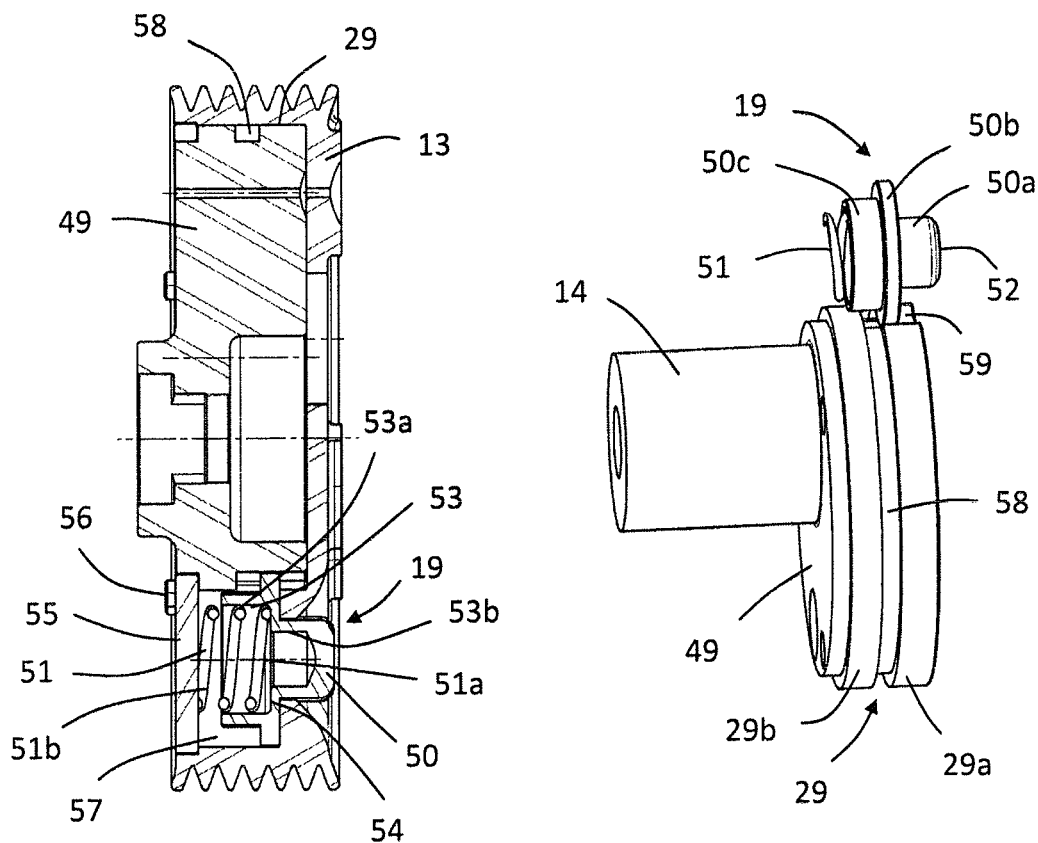
Fig. 10b
Fig. 10c

BELT DRIVE FOR A MOTOR-DRIVEN TOOL

The present invention relates to a belt drive for a motor-driven tool with a first, drive-side belt pulley, a second tool-side belt pulley and a belt that can be tensioned over the first and second belt pulley. The invention also relates to a motor-driven tool and method of assembling a belt on a belt drive of a motor-driven tool.

STATE OF THE ART

Such motor-driven tools are preferably hand-held tools such as angle grinders or hand-held circular saws. The motor-driven tools have a motor which is accommodated in a housing connected to the basic body of the motor-driven tool. Spatially separated from the motor, the motor-driven tool has a tool, for example an angle grinding blade or a circular saw blade. Due to the spatial separation between the motor and the tool a belt drive is provided in order to transmit the drive output of the motor to the tool. The drive-side belt pulley rotates in a drive axle or with drive shaft and is driven by the motor, while tool-side belt pulley rotates in a tool axle or with a tool shaft which is firmly connected to the tool in a rotating manner. A belt is tensioned over the belt pulleys so that the tool-side pulley is driven by the drive-side pulley. The drive shaft and the tool shaft are in parallel and a distance from one another.

In accordance with the known state of the art, in order to tension the belt over the belt pulleys it must be pulled over the rigidly arranged belt pulleys whereby it underdoes great stretching. This can result in overstretching of the belt. Fundamentally a distinction can be made between non-elastic and elastic belts, more particularly ribbed belts. For tensioning elastic belts tensioning devices are known which keep the elastic belt tensioned.

For example, DE 10 2008 023 927 A1 describes a motor-driven tool with a motor and a tool driven by the motor via a belt drive, whereby the belt drive has a drive-side and a tool-side belt pulley, between which an elastic belt is tensioned. A tensioning device is provided and designed so that the tension in the elastic belts is maintained through the elasticity of the belt itself. The tensioning device is based on an eccentric cam principle, the design of which is complex and is susceptible to incorrect operation which can lead to failure of the belt drive and thereby failure of the motor-driven tool. More particularly a number of individual working stages in the correct sequence are required in order to correctly use the tensioning device so that a belt can be removed and also reapplied in the envisaged manner.

DISCLOSURE OF THE INVENTION

The invention is therefore based on the task of providing a belt drive which is characterised by simplified handling when assembling the belt.

In the case of a belt drive of the type described in the introduction, this task is solved in accordance with the invention in that arranged in the first or second pulley is a cam, which is rigidly connected to a shaft, whereby during a rotating movement of the shaft the belt pulley can by way of the cam be moved from an eccentric arrangement with regard to the shaft into a concentric arrangement via a translational and a rotating moving of the belt pulley.

In accordance with the invention this task is also achieved through a method of assembling a belt on a belt drive of a motor-driven tool having a first, drive-side belt pulley and a second, tool-sided belt pulley, in which a cam rigidly connected to a shaft is mounted with the first or second belt pulley, whereby the cam is arranged in the belt pulley in such a way that the belt pulley is in an eccentric arrangement with the shaft, the belt is applied in an untensioned state to the first and second belt pulley, and to transfer the belt from the untensioned state into a tensioned state the shaft carries out a rotational movement, whereby during the rotational movement of the shaft the belt pulley is transferred from an eccentric arrangement with regard to the shaft into a concentric arrangement via a translational and a rotating movement of the belt pulley.

This task is also achieved by a motor-driven tool with a motor and tool driven by the motor via a belt drive, whereby the belt drive is designed in accordance with any one of claims 1 to 9.

Advantageous further embodiments of the invention are set out in the dependent claims.

By means of the belt drive in accordance with the invention it is possible for a user to transfer a belt from an untensioned state into a tensioned state with little effort, in that through both a translational and also a rotational movement of at least one of the two belt pulleys the distance between the two belt pulleys is altered. A special tool is not necessary for this as it can be carried out solely through a rotational movement of the shaft on which the belt pulley to be moved is arranged. An additional tensioning device is also unnecessary. When altering the distance between the two belt pulleys in order to be able to apply the belt in an untensioned state to the belt pulleys, the distance between the drive shaft and the tool shaft remains the same so that these cannot carry out a translational movement, but only a rotational movement. This considerably simplifies the design of the belt drive. The amount of force required for assembly is also reduced. As a separate tensioning device is no longer required, but just a cam, connected to the belt pulley, which is rotatable via the shaft, preferably the tool shaft, to which it is rigidly connected, the number of components necessary for the belt drive is essentially reduced so that operation is also self-explanatory to a user, as a result of which assembly errors can be avoided and handling thereby further facilitated. Wearing of the belt can also be essentially reduced as the belt is applied to the belt pulley in an untensioned state and tensioning and thus stretching of the belt only takes place in stages when at least one of the two belt pulleys is transferred from an eccentric arrangement with regard to the corresponding shaft into a concentric arranged through a rotational and translational movement of the belt pulley whereby the distance between both belt pulleys is increased. The belt is preferably an elastic belt or stretch belt which is designed as a V-belt or ribbed belt for example.

The belt pulley, which can be moved into the concentric and eccentric arrangement, is preferably the second, tool-side belt pulley, so that the tensioning of the belt takes place via the tool shaft which moves the tool-side belt pulley via the cam both in a translational and rotational manner. Alternatively, however, it can also be the first drive-side belt pulley which is then moved by the drive shaft via the cam both in a translational and rotational manner.

For tensioning the belt the shaft can preferably be turned clockwise and/or anticlockwise so that the tensioning of the belt is possible in both directions of rotation of the shaft. For moving the belt from the untensioned state into the tensioned state the shaft can therefore be turned clockwise and/or anti-clockwise.

In order to prevent the belt pulley moved by the shaft into the concentric arrangement unintentionally turning back into the eccentric arrangement, the cam can have an arrester element that automatically engages with the belt pulley. During the movement from the eccentric arrangement into the concentric arrangement relative rotation between the cam and the belt pulley takes place. By way of the arrester element this relative movement between the cam and the belt pulley can be stopped as soon as the belt pulley is in a concentric arrangement with the shaft and the belt is therefore in the tensioned state. Even if the shaft is rotated further, the automatically engaging arrester element prevents a return of the belt pulley into the eccentric arrangement as the belt pulley can now only carry out a rotational movement together with the cam and shaft, but no longer a translational movement. Through the automatic engaging of the arrester element the arrester element does not have to be operated by an operator when engaging, as the engaging takes place automatically as soon as the concentric arrangement between the belt pulley and shaft is attained, so that the required assembly force can be reduced. In this way the handling of the belt drive can be further simplified during assembly, misalignment of the belt pulley on the shaft can be prevented, wearing of the tribological pairings of the assembly unit can be minimised and an even rotation of the belt pulley on the shaft can be assured. Furthermore, for the belt drive components materials with a lower weight can be used, the fastening screws used during assembly can be equally strongly tightened and plenty of space can be provided for symmetrical uptake for the decrease in load on a power brake of the motor-driven tool.

The arrester element can be a leaf spring, which is bendably arranged in a recess in the cam and can engage in a groove formed on the belt pulley. The arrester element in the form of a leaf spring requires less space in the cam and the belt pulley and is also characterised by a simple design. The leaf spring is inserted into a recess formed on the cam and projects with one end from the recess, whereby in the eccentric arrangement of the belt pulley in relation to the shaft the leaf spring is under tension in the cam. As soon as the belt pulley and the shaft are arranged concentrically, the groove formed in the belt pulley is arranged in prolongation to the recess in the cam so that the tensioned leaf spring can engage with its end projecting from the recess in the groove, the tension in the leaf spring is thus released and the locking brought about. Releasing of the leaf spring from the groove in order to move the shaft with the belt pulley from the concentric arrangement back into the eccentric arrangement preferably takes place with a tool which bends the leaf spring in the recess so that the end projecting from the recess can spring out of the groove, whereby a relative movement between the belt pulley and the cam is possible again.

Alternatively the arrester element can be a spring-loaded arrester pin or arrester bolt which is arranged in a recess formed in the cam and which can engage in a drilled hole formed in the belt pulley. In the case of a spring-loaded arrester pin this can be simply released from the drilled hole by hand without the need for a tool by being pressed into the recess in the direction of the cam. In the eccentric arrangement of shaft in relation to the belt pulley the spring-loaded arrester pin is not engaged in the hole of the belt pulley but is tensioned and presses against a surface in the belt pulley so that the arrester pen is moved together with the cam relative to the belt pulley. As soon as the drilled hole in the belt pulley is opposite the recess in the cam and the shaft is arranged concentrically to the belt pulley, one end of the spring-loaded arrester pen can engage in the drilled hole, i.e. it is transferred from tensioned state into an untensioned state and brings about locking. The arrester element in the form of a spring-loaded arrester pin requires little space in the cam and the belt pulley and is also characterised by a simple design.

As a further alternative the arrester element can be a spring-loaded arrester button which is arranged in a recess in the belt pulley and rests on an outer circumferential surface of the cam. In the arrested state the arrester button engages in a recess formed on an outer circumferential surface of the cam as a result of which the rotational movement of the cam and thereby a relative movement between the cam and the belt pulley is prevented. In the released state of arresting the arrester button engages in a circumferential groove formed on the outer circumferential surface of cam so that cam can be moved relative to the arrester button in that during a rotational movement of the cam the arrester button is guided in the groove. In this way a relative movement between the cam and the belt pulley is also possible.

In order to allow the belt pulley to move relative to the cam, and thereby the shaft, for carrying out the translational and rotational movement the belt pulley can have a semi-circularly curved elongated hole into which the shaft engages. A first end of the semi-circularly curved elongated hole is arranged centrically with regard to the belt pulley so that in the concentric arrangement the shaft rests on the first end of the semi-circularly curved elongated hole. A second end of the semi-circularly curved elongated hole opposite the first end is located eccentrically with regard to the belt pulley so that in the eccentric arrangement the shaft lies on the second end of the semi-circularly curved elongated hole. By way of the semi-circularly curved elongated hole both the translational and also the rotational movement of the belt pulley relative to the shaft can be achieved through a simple design.

In order to prevent, with simple means, the cam and belt pulley becoming detached from one another, particularly when moving from the eccentric arrangement into the concentric arrangement and vice-versa, a plate-shaped securing element is arranged on the belt pulley to secure the cam in the belt pulley. The securing element at least partially covers the securing element so that the cam is held in the belt pulley even during a relative movement between the cam and the belt pulley. Preferably the securing element together with the belt pulley forms a gear mechanism for a contact surface of the cam via which the relative movement between the cam and the belt pulley can be brought about. The securing element can terminate flush with an outer surface of the cam and thus exhibit a sealing function which prevents foreign particles such as dust, more particularly concrete dust, penetrating into the belt pulley and thus between the belt pulley and the cam which would hinder a relative movement between the belt pulley and the cam, and thereby cause wear to the belt pulley and cam.

The securing element can be formed in one piece with the belt pulley. Additional assembly steps to fasten the securing element to the belt pulley can thereby be avoided, so that the assembly costs and assembly time can be reduced. In a one-piece embodiment the belt pulley can for example be die-cast together with the securing element, whereby in order to facilitate removal from a die-casting tool the securing element preferably has one or more undercuts.

Alternatively the securing element can be a separate component from the belt pulley. In a further embodiment of the securing element the securing can be connected to the belt pulley by means of a screw-connection, caulking or welding. Connection to the belt pulley can take place before or after the insertion of the cam into the belt pulley.

For guiding of the cam in the belt pulley the cam can have a guide element which forms a contact surface of the cam in the belt pulley, though which the relative rotation between the cam and the belt pulley can be brought about. The guide element is preferably formed on an outer surface of the cam in the form of bulge projecting from the outer surface of the cam, whereby the guide element is preferably covered by the securing element so that loosening of the cam from the belt pulley can be prevented. A hole can be formed in the guide element via which the cam and/or the guide element can be screwed with a fastening screw to the belt pulley in the concentric arrangement of the belt pulley with the shaft.

In order to achieve a rotational as well as a translational movement of the belt pulley in a relative rotation between the belt pulley and the cam, when moving from the eccentric arrangement into the concentric arrangement the shaft preferably covers a greater rotational path than the belt pulley in its rotational movement, whereby the shaft is preferably turned about 360° and the belt pulley preferably about 180°.

Before or after arranging the cam in the belt pulley a plate-like securing element can be arranged on the belt pulley which prevents the cam becoming detached from the belt pulley even if the cam can be turned relative to the belt pulley.

In order to prevent the belt pulley being released from the concentric arrangement with the shaft and the belt being released from the tensioned state, in the concentric arrangement an arrester element, preferably arranged on the cam, automatically locks the belt pulley.

To secure the cam to the belt pulley in the tensioned state of the belt, in the concentric arrangement the cam can be connected to the belt pulley by means of at least fastening screw.

The motor-driven tool can have a radial arm on which the tool is rotatably arranged via the tool shaft. The radial arm therefore forms a rigid arrangement of the drive shaft to the tool shaft. The radial arm can be designed with two bearing channels and the radial arm can be a component part of the basic body of the motor-driven tool. More particularly the radial arm is rigidly connected to the basic body, i.e. the radial arm is not arranged in a moveable manner on the basic body, more particularly not in a pivoting or articulated manner, so that no tensioning device is formed. This produces a further simplification of the design of the motor-driven tool.

PREFERRED EXAMPLES OF EMBODIMENT

Figure 1C:
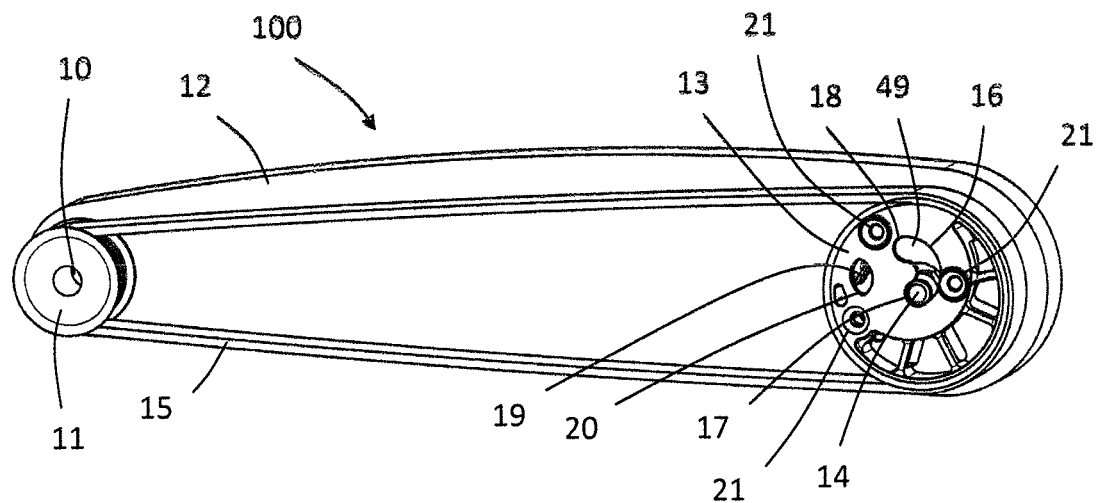
Figure 1D:
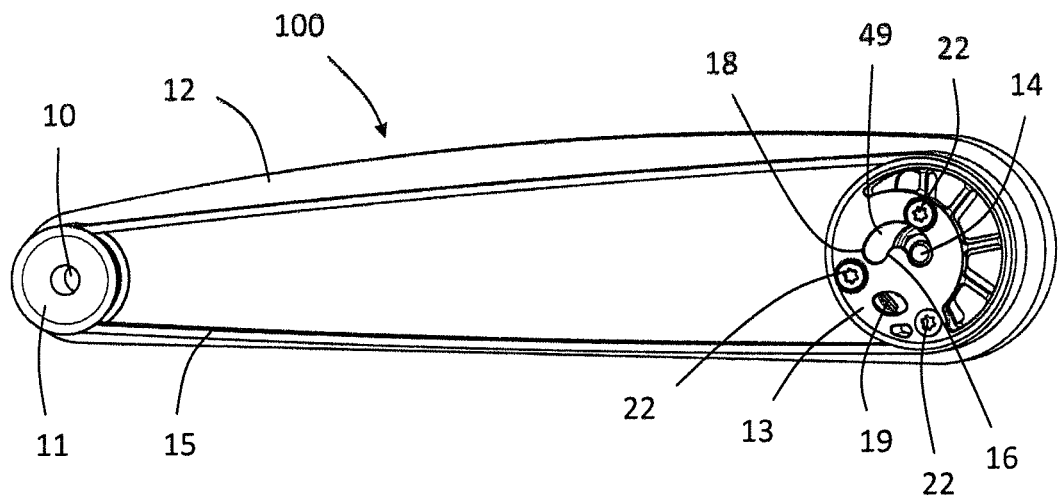
Figure 2A:
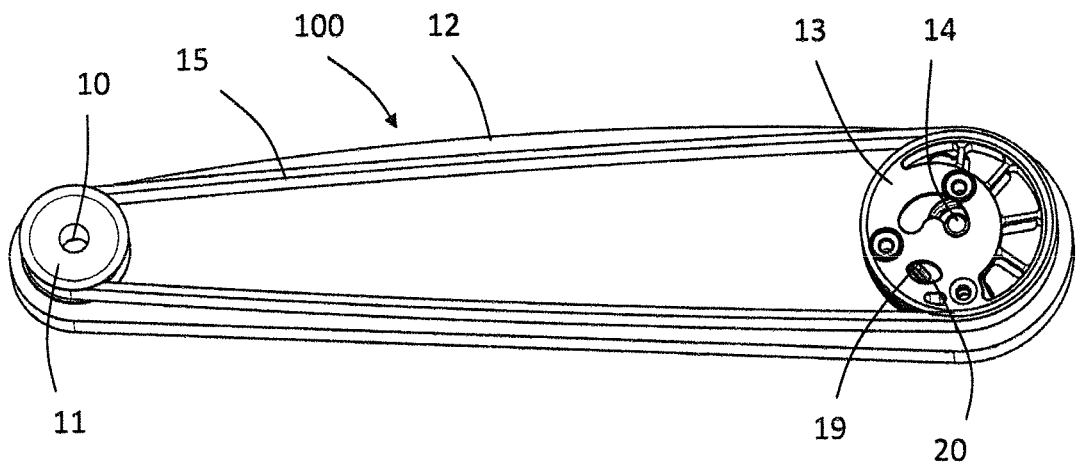
Figure 2B:
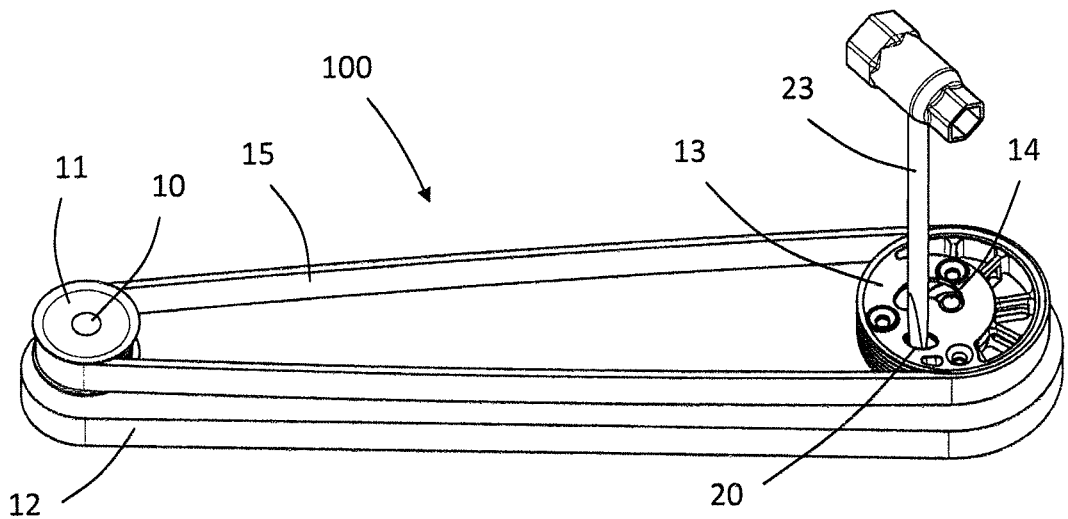
Figure 2C:
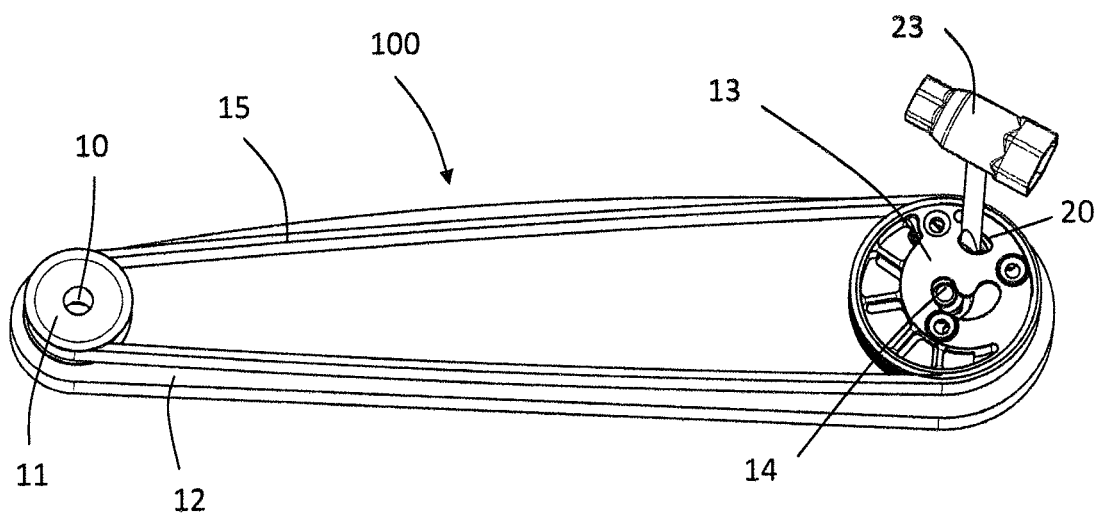
Figures 8A, 8B:
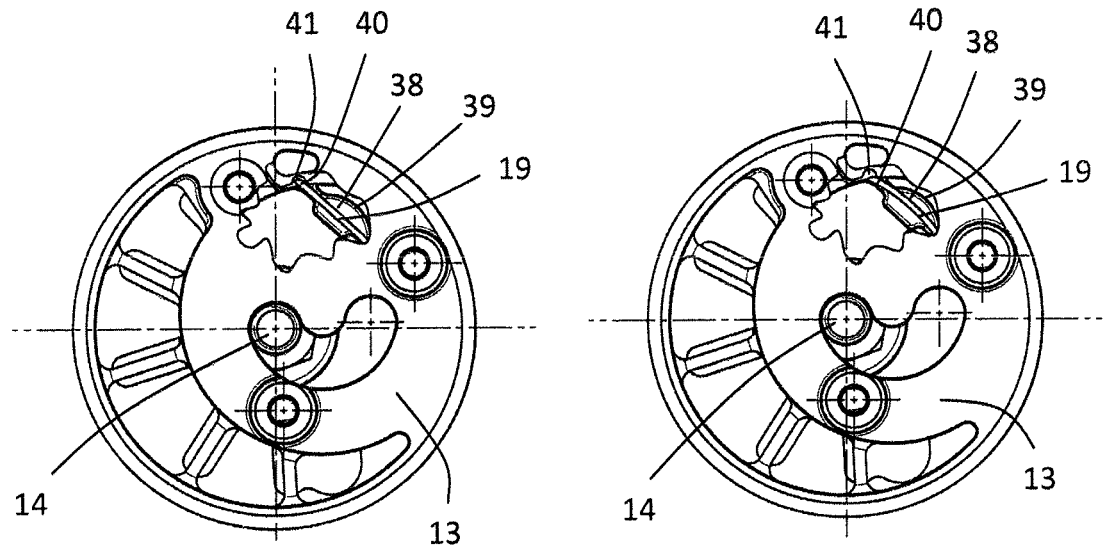
Figure 8C:
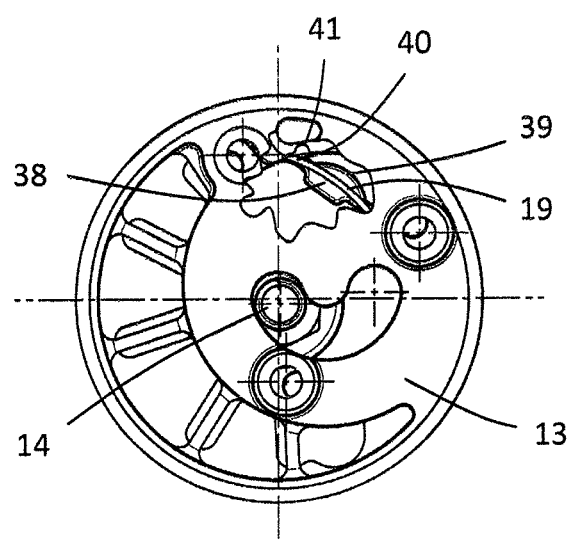

Further measures to improve the invention are set out in more detail below together with the description of preferred forms of embodiment with the aid of the figures, whereby:

FIG. 1a-FIG. 1d show a schematic view of a method of assembling a belt on a belt drive in accordance with the invention, FIG. 2a-FIG. 2c show a schematic view of method of detaching a belt from a belt drive in accordance with the invention, FIG. 3a-FIG. 3d show a schematic view of an arrangement of a cam on a belt pulley in accordance with a first embodiment of the invention, FIG. 4a-FIG. 4d show a schematic view of an arrangement of a cam in a belt pulley in accordance with a second embodiment of the invention, FIG. 5 shows a schematic view of the cam in accordance with the invention, FIG. 6 shows a schematic view of the cam shown in FIG. 5 with a shaft arranged thereon in accordance with the invention, FIG. 7 shows a schematic view of a belt pulley in accordance with one embodiment of the invention, FIG. 8a-FIG. 8c show a schematic view of releasing an arrester element in accordance with the invention in the form of a leaf spring, FIG. 9a-FIG. 9f show a schematic view of releasing an arrester element in accordance with the invention in the form of an arrester pin, and FIG. 10a-FIG. 10f show a schematic view of loosening a spring-loaded arrester element in accordance with the invention in the form of an arrester button.

In FIG. 1a-1d the course of assembly of a belt drive 100 of a motor-driven tool is shown. The motor-driven tool can be, for example, a hand-guided portable motor saw, or a manual, portable angle grinder. The motor-driven tool has a motor, for example a reciprocating motor or a rotary piston motor, which is not shown here. The motor drives a motor shaft or drive shaft 10 which rotates a drive axle. A first drive-side pulley 11 is arranged on the drive shaft 10. The first, drive-side belt pulley 11 is arranged at a first end of a rigidly designed radial arm 12 of the motor-driven tool. Arranged at a second end of the radial arm 12 opposite the first end is a second, tool-side belt pulley 13 which is connected to a tool shaft 13 on which a tool (not shown) of the motor-driven tool is arranged which can be turned via the tool shaft 14. A belt 15 is looped around both the first belt pulley 11 and the second pulley 13, so that the first, motor-driven, belt pulley 11 can bring about rotation of the second, tool-side belt pulley 13 on operation of the motor-driven tool. The belt is designed as an elastic belt. The first belt pulley 11 is firmly connected to the shaft 10 so that no relative distortion can occur between the belt pulley 11 and the shaft 10. The belt pulley 11 is thus in a fixed, concentric arrangement with the shaft 10. On the other hand the second belt pulley 13 and its assigned shaft 14 can be moved into a concentric arrangement and an eccentric arrangement, whereby in the eccentric arrangement the distance between the two belt pulleys 11, 13 is smaller than in the concentric arrangement of the shaft 14 with the second belt pulley 13. However, the distance between the two shafts 10, 14 cannot be changed.

FIG. 1a shows an eccentric arrangement of the second belt pulley 13 in relation to the tool shaft 14 which means that they are not centered with regard to each other. In this eccentric arrangement the belt 15 can be guided or placed over both belt pulleys 11, 13 without the belt having to be tensioned. The belt is in an untensioned state so that on being placed over the two belt pulleys 11, 13 the belt 15 is not stretched and thereby put under strain, as a result of which wearing of the belt 15 can be reduced.

The second, tool-side belt pulley 13 has a semi-circularly curved elongated hole 16 which has a first end 17 and a second end 18. The shaft 14 engages in the elongated hole 16. Via the elongated hole 16 the belt pulley 13 can be moved both in a translational as well as a rotational manner, whereby during a movement of the belt pulley 13 both in translational as well as a rotational manner a displacement of the shaft 14 from the first end 17 to the second 18 of the elongated hole 16 and vice-versa takes place. If the shaft 14 is positioned at the first end 17, the shaft 14 and the belt pulley 13 are arranged concentrically with regard to each other. If the shaft 14 is positioned at the second end 18, the shaft 14 and the belt pulley 13 are arranged eccentrically with regard to each other. In the position shown in FIG. 1a the shaft 14 is positioned at the second end 18 so that the belt 13 is arranged eccentrically in relation to the shaft 14.

The shaft 14 is rigidly connected to a cam 49, as shown in particular in FIG. 5. The cam 49 is arranged in the belt pulley 13. During a rotational movement of the shaft 14, by way of the cam 49 the belt pulley 13 is moved from the eccentric arrangement into the concentric arrangement, as shown in FIG. 1c and FIG. 1, through a translational and rotational movement of the belt pulley, whereby, as shown FIG. 1a to FIG. 1c, it can be seen that the position of the shaft 14 in the elongated hole 16 migrates in a translational and rotational manner through the movement of the belt pulley 13. During the translational movement of the belt pulley 13 the distance between the two belt pulleys 11, 13 increases as the second belt pulley 13 is moved away from the firmly arranged first belt pulley 11. During the rotational movement of the belt pulley 13 the belt pulley 13 is turned anticlockwise.

In the position shown in FIG. 1c the belt pulley 13 and shaft 14 are in the concentric arrangement as the shaft 14 is already at the first end of the elongated hole 16 so that when moving from the position shown in FIG. 1c to the position in FIG. 1d no further translational movement of the belt pulley 16 takes place, and the belt pulley 13 is only rotationally moved around the shaft 14, whereby the belt pulley 13 and shaft 14 are already arranged concentrically in relation to each other and turn about a common axis.

On reaching the position shown in FIG. 1c an arrester element 19 automatically engages with the belt pulley 13 as a result of which a movement of the belt pulley 13 from the concentric arrangement back into the eccentric arrangement is prevented. Via an opening 20 formed in the belt pulley 13 the engaged arrester element 19 can be released by introducing a tool into the opening 20.

In addition, in the embodiment shown here the belt pulley 13 has three further openings 21, via which fastening screws 22 as shown in FIG. 1d, can be screwed into the belt pulley 13 and the cam 49, in order to firmly connect the belt pulley 13 with the cam 49 in the end position of the belt pulley 13 when the belt 15 is tensioned, as shown in FIG. 1d. After the assembly of a belt cover, which is not shown here, the motor-driven tool can then be operated.

When transferring the belt pulley 13 from the position shown in FIG. 1a into the position shown in FIG. 1d the shaft is turned about around 360° and the belt pulley about around 180° so that the rotational path of the shaft 14 is double the rotational path of the belt pulley 13.

FIG. 2a-FIG. 2c show detachment of the belt 15, whereby before being removed from the two belt pulleys 11, 13 the belt 15 is initially brought into an untensioned state as shown in FIG. 1a.

During detachment the fastening screws 22 are first of all removed, as shown in FIG. 2a. Then, as shown in FIG. 2b, a tool, in this case in the form of a screwdriver, is introduced into the opening 20 in order to release the engagement of the arrester element 19. As shown in FIG. 2c the engagement is released by way of a turning movement of the tool 23 in the opening 20 as a result of which the arrester element 19 is disengaged from the belt pulley 13 and the belt pulley 13 can by way of a translational movement be moved relative to the shaft 14 in the direction of the belt pulley 11. Through this movement of the belt pulley 13, via a rotational movement of the shaft 14 in the opposite direction to that during assembly, as shown in FIG. 1a-1d, the belt pulley 14 is returned to an eccentric arrangement in relation to the shaft 14, as a result of which the belt 15 can be brought back into an untensioned state, as show in FIG. 1a, and the belt 15 can thus be easily removed from both belt pulleys 11, 13 without having to be stretched.

FIG. 3a-FIG. 3d show a possible assembly of the belt pulley 13 with the cam 49 and/or the shaft 14.

Figure 3A:
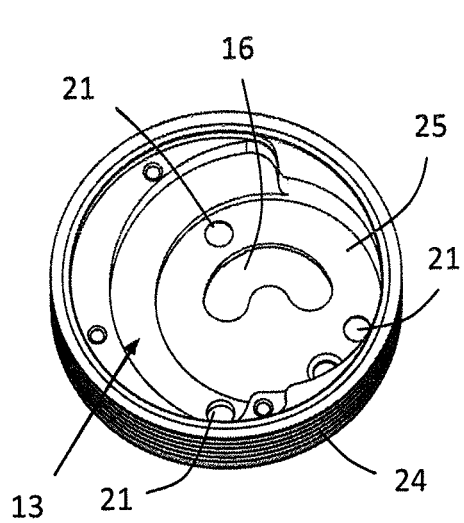

FIG. 3a shows the belt pulley 13, which has no undercuts, before assembly with the cam 49 and shaft 14. The belt pulley 13 is produced in one piece and has an annular surface 24 over which the belt 15 is guided. The annular surface 24 is closed on one side with a circular wall surface 25 in which the elongated hole 16 and the openings 20, 21 for the arrester element 19 and the fastening screws 22 are formed, whereby the openings 20, 21 are arranged around the elongated hole 16. On the side opposite the wall surface 25 the belt pulley 13 is essentially open so that the cam 49 can be introduced and assembled in the belt pulley 13 via this open side.

Figure 3B:
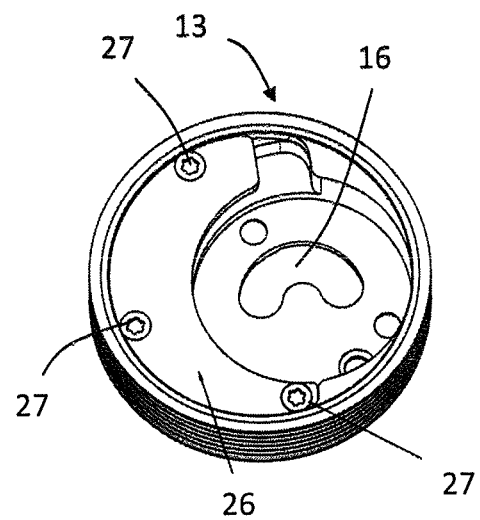

Before introducing the cam 49 into the belt pulley, in the form of embodiment shown in FIGS. 3a-3d a plate-like securing element 26, in the form of a securing plate for example, is first of all arranged on the belt pulley 13, more particularly on the open side of the belt pulley 13 and fastened there by means of screws 27 as shown in FIG. 3b. However, fastening can also take place by means other than screws 27. By way of the securing element 26 the open side of the belt pulley 13 is at least partially closed. Preferably the securing element 26 covers approximately ⅓ of the surface of the open side of the belt pulley 13. The securing element 26 show here is sickle-shaped. The securing element 26 together with the belt pulley 13 forms the setting for a stop surface of the cam 49.

Figure 3C:
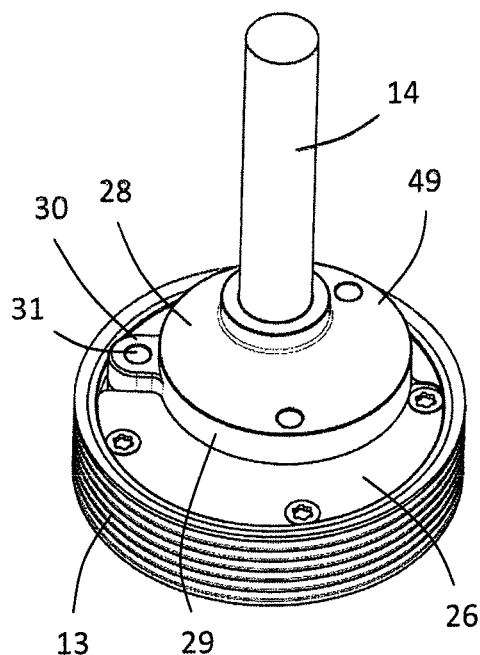
Figure 3D:
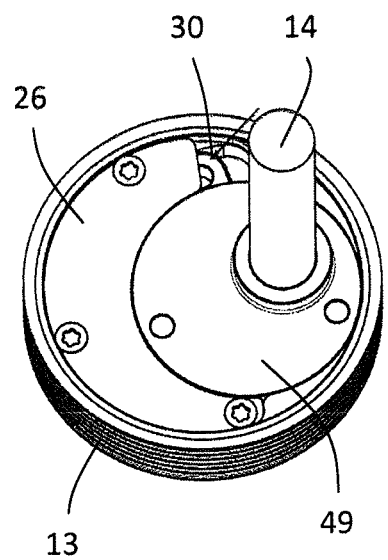

After assembling the securing element 26 on the belt pulley 13 the cam 49 together with the shaft 14 already eccentrically fastened to the cam 49 is introduced into the belt pulley as shown in FIG. 3c and FIG. 3d. The cam 49 is introduced into the belt pulley 13 in such a way that that the shaft 14 and the belt pulley 13 are arranged eccentrically with regard to each other.

The cam 49 is essentially made of a circular basic body 28 on the outer circumferential surface 29 of which a guide element 30 is formed, which projects from the outer circumferential surface 29 and in the form of embodiment shown here is designed as bulge. By means of the guide element 30 the cam 49 is guided in the belt pulley 13 during a rotational movement of the shaft 14 in that the guide element 30 is guided between the securing element 26 and the wall surface 25 of the belt pulley 13 in such a way that loosening or slipping of the belt pulley 13 from the cam 49 is prevented. The cam 49 and/or the shaft 14 can thereby be transferred from the eccentric arrangement into the concentric arrangement secured in the belt pulley 13. In the guide element 30 there is a drilled hole 31 through which a fastening screw 22 can be inserted when fastening the cam 49 to the belt pulley 13.

Figure 4A:
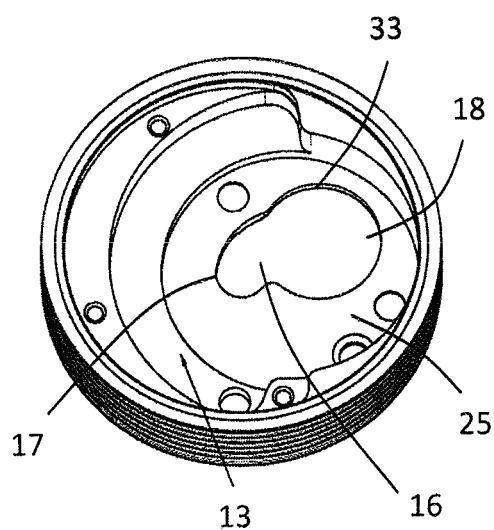
Figure 4B:
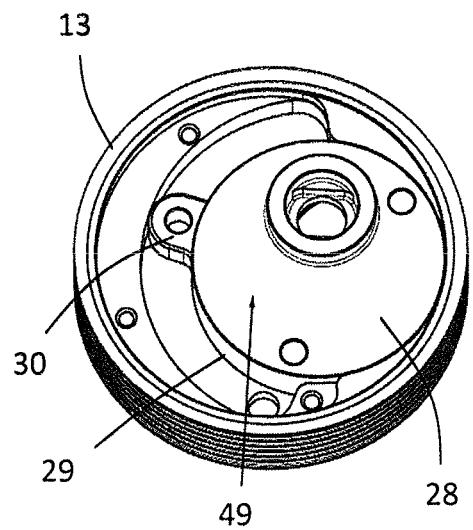
Figure 4C:
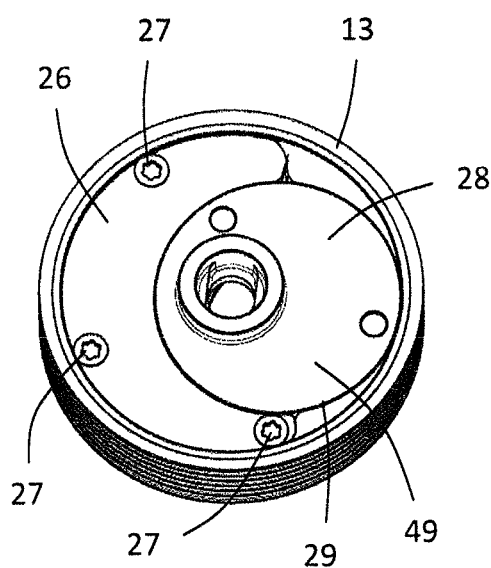
Figure 4D:
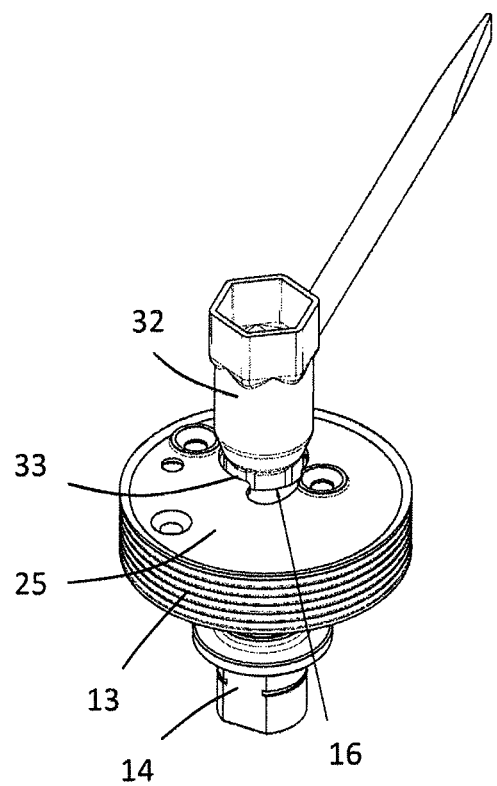

FIG. 4a-FIG. 4d show a further possible assembly of the belt pulley 13 with the cam 49 and the shaft 14, whereby the cam 49 is initially mounted in the belt pulley 13 with a shaft 14 and the plate-like securing element 26 is only fastened to the belt pulley 13 after introducing the cam 49 into the belt pulley 13. Here, the elongated hole 16 has a larger circumference at its second end 18 than at its first end 17 in order to allow the penetration of a tool 32, as shown in FIG. 4d, which, in the eccentric arrangement fastens the shaft 14 on the cam 49 already arranged in the belt pulley 13. The larger circumference of the elongated hole 16 at its second end 18 is formed by an additional, essentially circular recess 33 at the second end 33.

As shown in FIG. 4b the cam 49 is initially inserted without an attached shaft 14 in any position in belt pulley 13. The plate-like securing element 26 is assembled on the belt pulley 13 in that it covers the guide element 30 formed on the cam 49.

As shown in FIG. 4c, in this form of embodiment the securing element 26, essentially flush with the cam 49, seals off the basic body 28 or the outer circumferential surface 29 of the cam 49 so that the securing element 26 functions as a seal in relation to the cam 49 and any contaminants, more particularly concrete dust, can be kept away from the guide mechanism of the belt pulley 13.

After fastening the securing element 26, via the recess 33 the belt pulley 13 designed as a unit with the cam 49 is screwed to the shaft 14 with the tool 14.

In FIG. 5 a cam 49 without a shaft 14 is shown. At the outer circumferential surface 29 of the basic body of the cam 49 the cam 49 has the guide element 30, whereby a hole 31 is provided on the guide element 30. On the basic body 28 two further holes 34 are provided through which the fastening screw 22 can be inserted when fastening the cam 49 to the belt pulley 13. The cam 49 also has an opening 35 through which one end of the shaft 14 is passed in order to connect the cam 49 to the shaft 14, as is shown in FIG. 6. Around the opening 35, on one side of the cam 49 there is a recess 36 with a larger circumferential surface than the opening 35, into which a nut can engage which is not shown here and by means of which the shaft 14 can be firmly connected to the cam 49. In addition, on the basic body 28 adjacent to the guide element 30 there is an essentially slit-shaped recess 38 into which an arrester element 19 in the form of a leaf spring can be inserted. The recess 38 has a bulbous section 39 into which the leaf spring can move out of the way when bending the leaf spring to disengage the arrester element 19.

FIG. 7 shows a further possible embodiment of a belt pulley 13, whereby in contrast to the previously shown belt pulleys 13 the plate-like securing element 26 is here designed in one piece with the belt pulley 13, whereby such a belt pulley together with the securing element 26 is preferably produced in a die-casting process. Several undercuts 37 are formed on the securing element 26 through which during production in a die-casting process the removal of the finished component, more particularly the belt pulley 13 can be facilitated.

In FIGS. 8a-8c an arrester element 19 in accordance with one possible embodiment is shown, whereby the arrester element 19 is here in the form of a rod-shaped leaf spring. The arrester element 19 is inserted into the recess 38 and projects with a free end 30 into a groove 41, formed in the belt pulley 13, and engages therein, as shown in FIG. 8a. In the engaged position the groove 41 in the belt pulley 13 is arranged as a prolongation of the recess 38 in the cam 49 so that the arrester element 19 in the form of a leaf spring is straight during engagement and therefore not tensioned.

To release the engagement a tool is introduced which presses the arrester element 19 in the form of a leaf spring out of the groove 41 in the belt pulley 13 in that the leaf spring is bent and shortened, whereby it is bent into the bulbous section 39 of the recess 38 in order to tension the leaf spring, as is shown in FIG. 8b and FIG. 8c. As soon as the free end 40 of the leaf spring disengages from the groove 41 the belt pulley 13 can again be moved in a translational manner and thus from the concentric arrangement with the shaft 14 into the eccentric arrangement, as shown in FIG. 8c.

FIGS. 9a-9f show a further embodiment of the arrester element 19 whereby here the arrester element 19 is in the form of a spring-loaded arrester pin. The spring-loaded arrester pin has, as shown in particular in the cross-section view in FIG. 9b, a pin 42 or bolt as well as a coil spring 43. The arrester element 19 in the form of the spring-loaded arrester pin is arranged in a recess 44 arranged in the basic body 28 of the cam 49 and can engage with a free end 45, which is chamfered, in a hole 46 provided on the belt pulley 13.

Figure 9A:
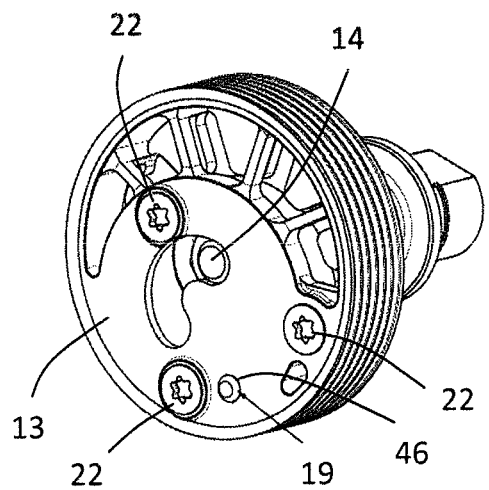
Figure 9B:
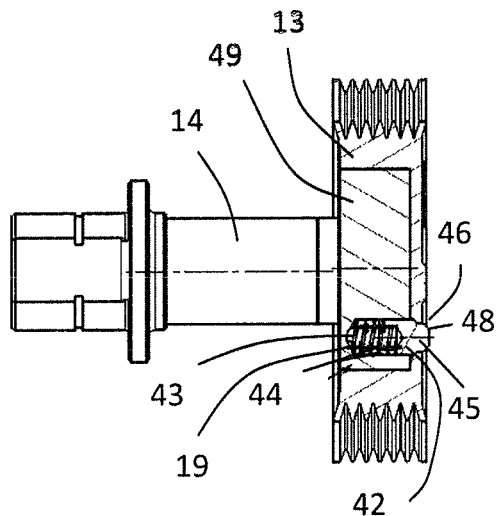

FIG. 9a shows a state in which the arrester element 19 in the form of a spring-loaded arrester pin is engaged in the hole 46. FIG. 9b shows a lateral cross-section of the position sown in FIG. 9a.

Figure 9C:
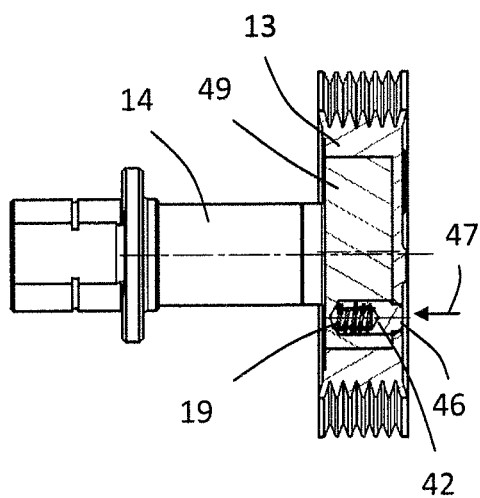
Figure 9D:
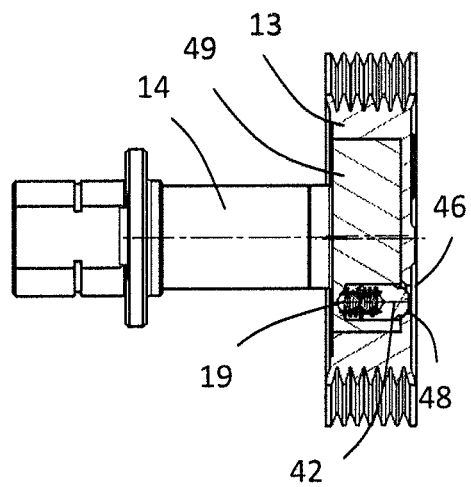
Figure 9E:
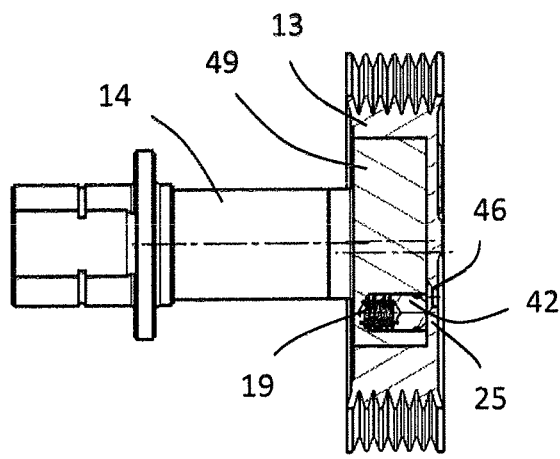
Figure 9F:
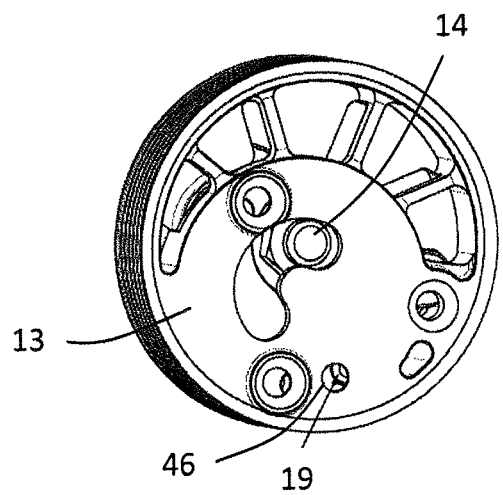

To release the arresting, the arrester element 19 is pushed in accordance with the arrow, preferably manually, into a release position in the direction of the cam 49 as shown in FIG. 9c, until the free end 45 of the arrester pin 42 has been pushed so far out of the hole 46 in the belt pulley 13 that the belt pulley 13 can slide along the chamfer 48 on the free end of the arrester pin 42, as shown on FIG. 9d, whereby the arrester pin 42 is completely released from the hole 46 in the belt pulley 13 and the hole 46 can thus be displaced relative to the recess 44 through a movement of the belt pulley 13 relative to the cam 49, as shown in FIG. 9e. The belt pulley 13 is now completely released from the arrester element 19 as a result of which the belt pulley 13 can again be moved from the concentric arrangement with the shaft 14 into the eccentric, whereby the spring-loaded arrester pin is tensioned by the coil spring 43 pressed against the wall surface 25 of the belt pulley 13 until a concentric arrangement is achieved again and the spring-loaded arrester pin can automatically engage in the hole 46 opposite the recess 44. In FIG. 9f the arrester element 19 is released as it is now no longer engaged in the hole 46, but the belt pulley 13 is freely movable with regard to shaft 14 and/or the cam 49.

In FIGS. 10a-10f a further embodiment of the arrester element 19 is shown, whereby in this embodiment the arrester element 19 is in the form of a spring-loaded arrester button. The spring-loaded arrester button has a button element 50 and a spring element 51, in this case in the form of a coil spring. In the embodiment shown here, as can be seen for example in FIG. 10e, the button element 50 is longitudinally divided into three different partial sections 50a, 50b, 50c whereby each partial section 50a, 50b, 50c has a different outer diameter. The first partial section 50a, which is at the outside, has a pressure surface on its closed, chamfered end surface 52, via which an operator can actuate the arrester element by pressure and can thus release the arresting. Adjoining this is a centrally arranged partial section 50b, which has a larger outer diameter than that of the first partial section 50a. The adjoining third partial section 50c, which is also outside, has an outer diameter which is greater than the outer diameter of the first partial section 50a and smaller than the second partial section 50c. The three partial sections 50a, 50b and 50c are connected to each other in one piece.

The button element 50 has a blind hole 53 which extends over the three partial sections 50a, 50b, 50c whereby the blind hole is divided into two partial sections 53a, 53b, which have different diameters so that along the longitudinal axis of the blind hole a step 54 is formed. The spring element 51 is inserted into partial section 53a of the blind hole 53 with the larger diameter and is supported with a first end section 51a on the step 54, so that the spring element 51 is held in the button element 50 through its spring force. As a result an additional fastening element for fastening the spring element 51 in the button element 50 is not necessary. With a second end section 51b opposite the first end section 51a the spring element 51 is supported on a plate 55 which is fastened to the belt pulley 13 by means of a fastening element 56, here a pin which will be inserted or a rivet.

Figure 10D:
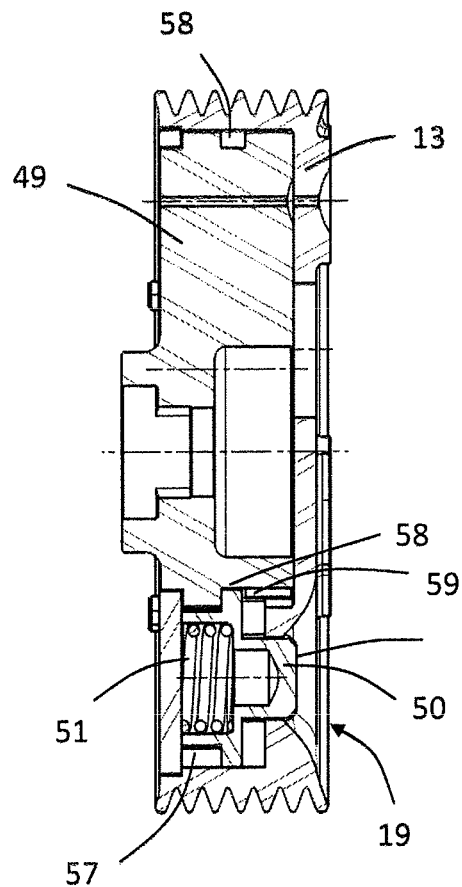

As can be seen in particular in FIG. 10b-10e, in the embodiment shown here, in contrast to the embodiment shown in FIGS. 9a-9f the arrester element 19 is not arranged inside the cam 50 but outside the cam 50 in a recess 57 of the belt pulley 13. The arrester element 19 is mounted on the outer circumferential surface 29 of the cam 49, whereby on the outer circumferential surface 29 of the cam 49 a circumferential groove 58 is formed which divides the outer circumferential surface 29 of the cam 29 into two partial sections 29a, 29b. In the first partial section 29a of the outer circumferential surface 29 of the cam 49 there is a recess 59 through which the outer diameter of the first partial section 29a of the outer circumferential surface 29 is reduced. In contrast to the first partial section 29a, the second partial section 29b of the outer circumferential surface 29 has a constant outer diameter over its outer circumferential surface. The third partial section 50c of the button element 50 rests on the section partial section 29b of the outer circumferential surface 29 of the cam 49 in such a way that the button element 50 can be moved in its longitudinal direction on the outer circumferential surface 29 of the cam 49. Through a displacement movement of the button element 50 the second partial section 50b of the button element 50 engages either in the recess 59 or the groove 58. If the second partial section 50b of the button element 50 engages in the recess 59 the arrester element 19 is arrested so that a rotational movement of the cam 49, and thus a relative rotation of the belt pulley 13 with regard to the cam 49, is not possible. This state is shown in FIGS. 10a-10c whereby FIG. 10b is a cross-section view of FIG. 10a and for the sake of simplicity in FIG. 10c only the cam 49 and the arrester element 19 are shown.

Figure 10E:
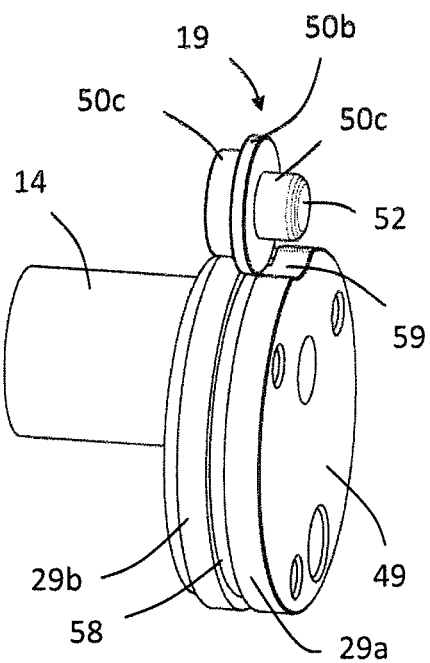

To release the engagement the arrester element 19 is pressed, preferably by hand, in accordance with the arrow 60 against the force of the spring element 51 into release position in the direction of the plate 55 until the second partial section 50b of the button element 50 no longer engages in the recess 59 but in the groove 58, as shown in FIGS. 10d and 10e, and the cam 49 can be freely rotated as the button element 50 is guided in the circumferential groove 58.

Figure 10F:
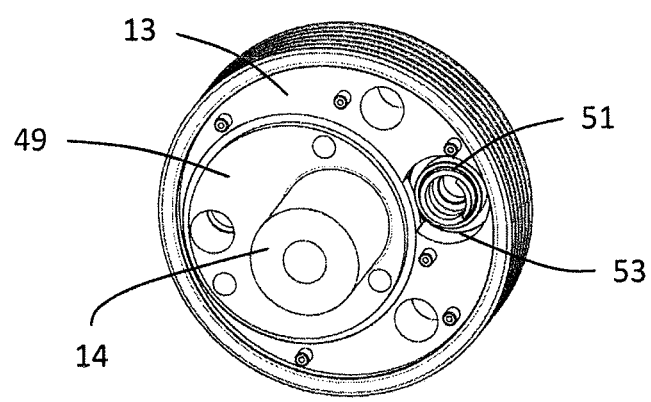

FIG. 10f shows a rear view of the cam 49 with the belt pulley 13 whereby the recess 57 in the belt pulley 13 with the spring element 51 of the arrester element 19 inserted therein is visible as a plate 55 has not yet been inserted and fastened in the recess 57.

The functional principle of the arrester element 19 in the form of a spring-loaded arrester button, as shown in FIGS. 10a-10f essentially corresponds with the functional principle of the arrester element 19 in the form of a spring-loaded arrester pin as shown in FIG. 9a-9f, whereby in contrast to the arrester pin 42 the button element 50, due to its larger outer diameter is more visible to an operator and therefore also easier to operate manually. In addition, the button element 50 together with the spring element 51 can be produced from a plastic injection moulded part as a result of which the number of parts to be assembled can be reduced. In addition, when using a button element 50 the cam 49 is also easier to produce as it no longer requires a separate recess 44 in the form of a hole.

The embodiment of the invention is not restricted to aforementioned preferred examples of embodiment. Rather, a number of variants are conceivable which utilise the described solution, even in entirely different types of embodiment. All the features and/or advantages set out in the claims, the description or the drawing, including design details, spatial arrangements and process stages can be essential to the invention both on their own as well as in the most varied of combinations.

REFERENCE LIST

100 Belt drive
10 Drive shaft
11 First, drive-side belt pulley
12 Radial arm
13 Second, tool-side belt pulley
14 Tool shaft
15 Belt
16 Elongated hole
17 First end
18 Second end
19 Arrester element
20 Opening
21 Opening
22 Fastening screw
23 Tool
24 Annular surface
25 Circular wall surface
26 Securing element
27 Fastening screw
28 Basic body
29 Outer circumferential surface
29a First partial section
29b Second partial section
30 Guide element
31 Drilled hole
32 Tool
33 Recess
34 Drilled hole
35 Passage opening
36 Recess
37 Undercut
38 Recess
39 Bulbous area
40 Free end
41 Groove
42 Pin
43 Coil spring
44 Recess
45 Free end
46 Drilled hole
47 Arrow
48 Chamfer
49 Cam
50 Button element
50a First partial section
50b Second partial section
50c Third partial section
51 Spring element
51a First partial section
51b Second partial section
52 End surface
53 Blind hole
53a First partial section
53b Second partial section
54 Step
55 Plate
56 Fastening element
57 Recess
58 Groove
59 Bulge
60 Arrow

The invention claimed is:

1. A belt drive for a motor-driven tool, comprising:
a work-side belt pulley;
a tool-side belt pulley;
a belt tensioned over the work-side belt pulley and the tool-side belt pulley;
a cam, rigidly connected to a shaft, arranged in of the work-side belt pulley and the tool-side belt pulley, the cam having a circular shape defined by an outer circumferential surface and a guide that projects from the outer circumferential surface,
wherein the guide is configured to guide the cam in the one of the work side belt pulley and the tool-side belt pulley, and whereby during a rotating movement of the shaft the one of the work-side belt pulley and the tool-side belt pulley is movable via the cam from an eccentric arrangement with regard to the shaft into a concentric arrangement by a translational and a rotational movement of the one of the work-side belt pulley and the tool-side belt pulley.

2. The belt drive according to claim 1, wherein when tensioning the belt the shaft can be turned clockwise and/or anticlockwise.

3. The belt drive according to claim 1, wherein the cam has an arrester that automatically engages with the one of the work-side belt pulley and the tool-side belt pulley.

4. The belt drive according to claim 3, wherein the arrester comprises a leaf spring which is bendably arranged in a recess formed in the cam and is configured to engage a groove formed on the one of the work-side belt pulley and the tool-side belt pulley.

5. The belt drive according to claim 3, wherein the arrester comprises a spring-loaded arrester pin which is arranged in a recess formed in the cam and is configured to engage a drilled hole formed in the one of the work-side belt pulley and the tool-side belt pulley.

6. The belt drive according to claim 3, wherein the arrester comprises a spring-loaded arrester button which is arranged in a recess of the one of the work-side belt pulley and the tool-side belt pulley and rests on an outer circumferential surface of the cam.

7. The belt drive according to claim 1, wherein the one of the work-side belt pulley and the tool-side belt pulley has a semi-circularly curved elongated hole into which the shaft engages to carry out the translational and rotational movement.

8. The belt drive according to claim 1, comprising a securing plate that secures the cam in the one of the work-side belt pulley and the tool-side belt pulley, wherein the securing plate is arranged on the one of the work-side belt pulley and the tool-side belt pulley.

9. The belt drive according to claim 8, wherein the securing plate is formed in one piece with the one of the work-side belt pulley and the tool-side belt pulley.

10. The belt drive according to claim 8, wherein the securing plate is designed as a separate component from the one of the work-side belt pulley and the tool-side belt pulley.

11. A motor-driven tool, with a motor and a tool driven by the motor via the belt drive provided in accordance with claim 1.

* * * * *